United States Patent [19]
Burke et al.

[11] 4,410,955
[45] Oct. 18, 1983

[54] METHOD AND APPARATUS FOR DIGITAL SHAPING OF A DIGITAL DATA STREAM

[75] Inventors: Timothy M. Burke, Ft. Worth, Tex.; George W. Meyer, Buffalo Grove, Ill.; John A. Moore, Portland, Oreg.

[73] Assignee: Motorola, Inc., Schaumburg, Ill.

[21] Appl. No.: 249,571

[22] Filed: Mar. 30, 1981

[51] Int. Cl.³ .............................................. G06F 1/02
[52] U.S. Cl. .................................. 364/718; 364/721; 328/14
[58] Field of Search ...................... 364/718, 721, 852; 328/14

[56] References Cited

U.S. PATENT DOCUMENTS

| | | | |
|---|---|---|---|
| 3,435,350 | 3/1969 | Powers | 328/14 |
| 3,657,657 | 4/1972 | Jefferson | 328/14 |
| 3,735,269 | 5/1973 | Jackson | 328/14 |
| 3,772,681 | 11/1973 | Skingle | 340/347 DA |
| 3,971,923 | 7/1976 | Linder | 307/228 X |
| 4,052,658 | 10/1977 | Hucker | 363/43 |
| 4,118,784 | 10/1978 | Nussbaumer | 364/724 |
| 4,146,931 | 3/1979 | Delforge | 364/724 |
| 4,225,936 | 9/1980 | Lesche | 364/718 |
| 4,338,674 | 7/1982 | Hamada | 364/718 |
| 4,346,448 | 8/1982 | Insam et al. | 364/721 X |
| 4,349,887 | 9/1982 | Crowley | 364/721 X |

Primary Examiner—David H. Malzahn
Attorney, Agent, or Firm—James A. Scheer; James W. Gillman; Edward M. Roney

[57] ABSTRACT

Digital method and apparatus for generation of a digital data stream with the bit transitions shaped to reduce splatter, and minimize droop and overshoot in a radio communications system utilizing digital coded squelch. A codeword digital data stream, in digitized form, is shaped so that the bit transitions have the form of a portion of a sine waveform and then is applied to a D/A converter. A simple filter follows the D/A converter to attenuate sampling noise.

9 Claims, 7 Drawing Figures

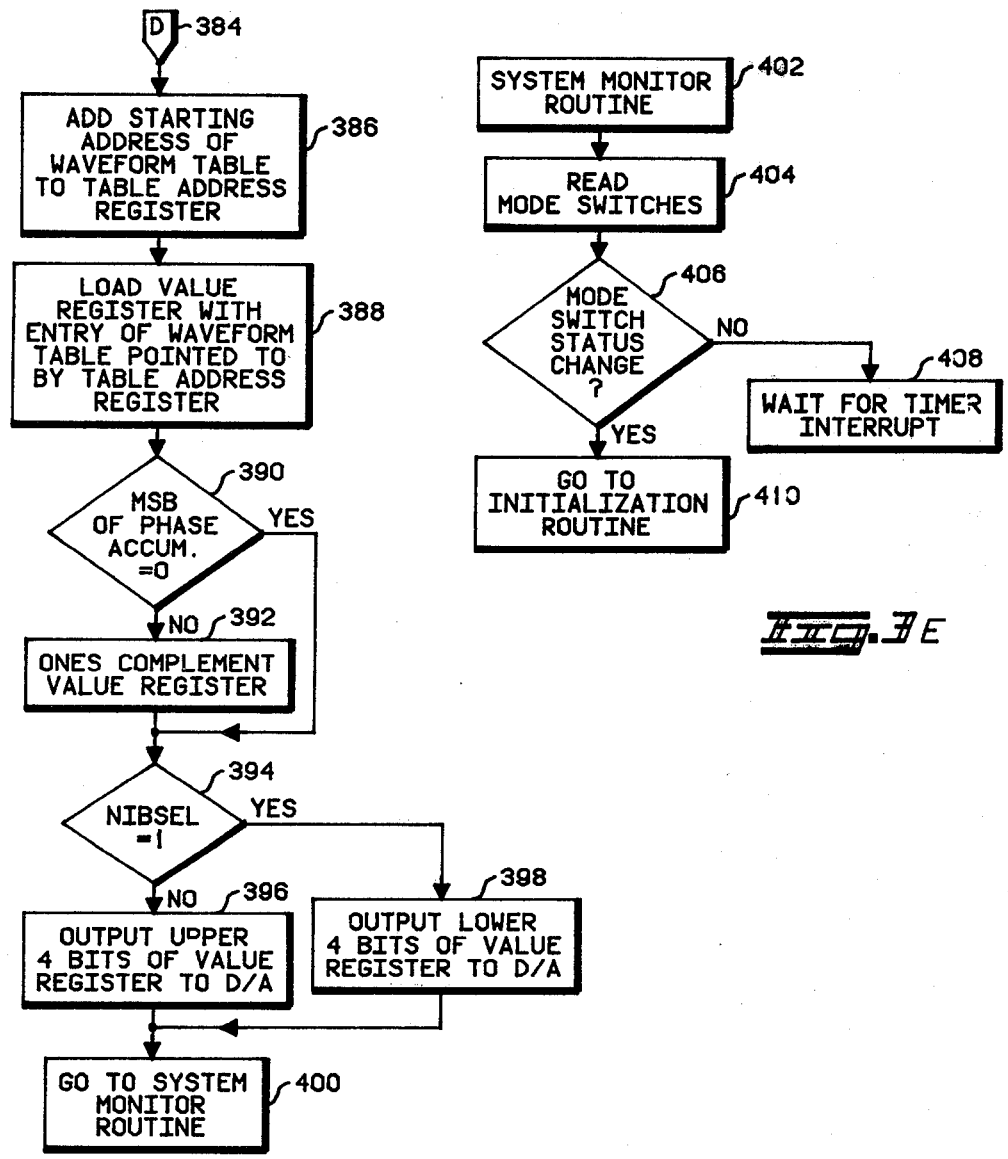

METHOD AND APPARATUS FOR DIGITAL SHAPING OF A DIGITAL DATA STREAM

BACKGROUND OF THE INVENTION

A. Field of the Invention

This invention relates generally to wave shaping circuits and more particularly to a digital waveform shaping method and circuitry for shaping the transitions of a digital data stream.

B. Description of the Prior Art

In many communication systems, digital data streams or codes are employed as the modulating waveform for a radio transmitter. For example, in mobile, portable or paging communication systems it is common for a digital data word to be used in a manner to selectively call a given receiver. A suitable digital data stream comprises a binary sequence of equal time interval bits. Typically, a binary "1" is represented by a "high" voltage level for a bit time period, and a binary "0" is represented by a "low" voltage level for the bit time period. Generation of N successive ones results in a constant high voltage level for N successive bit periods, and N successive zeros results in a constant low voltage for a period of N bits. The resulting digital waveform, therefore, is a series of rectangular pulses with very abrupt transitions. Due to the abrupt nature of the transitions, it is difficult to confine the spectral energy of a transmission to a desired narrow bandwidth when utilizing the data bit stream to modulate the transmitter carrier. The result is the generation of undesired spurious sidebands or splatter. Such undesirable radiation increases the radio frequency bandwidth occupied by the transmission.

One approach to overcoming this problem is to filter the modulating digital data stream, but this may not prove practical in applications where amplitude distortion caused by the filtering could significantly increase the error rate at the receiver or where adequate filtering would cause unacceptable droop in the digital bits. In addition, in communication systems utilizing tone coded squelch and digital coded squelch, this approach requires switching between multiple splatter filters.

Another approach is to generate an analog ramp function and switch in the generated function for the transitions. This approach is an expensive one, and the complex circuitry is not suitable for many compact systems.

Accordingly, it is a principle object of this invention to provide digital means for digital generation of a desired data bit stream with gradual transitions thereby minimizing generation of undesired spurious sidebands when the digital data stream is used to modulate the transmitter carrier.

It is another object of the invention to provide a programmable digital means for generation of a desired digital data bit stream wherein the waveform of the bit transitions is programmable.

It is still another object of the invention to provide a digital means for a digital coded squelch communication system for digitally generating a desired digital data bit stream such that the bit transitions are made gradual prior to modulation of the carrier.

It is yet another object of the invention to provide a digital means for combined tone coded and digital coded squelch communication systems for digitally generating a desired data bit stream which eliminates the need for multiple splatter filters and which minimizes component requirements.

Briefly, according to one embodiment of the invention, there is provided digital waveform shaping apparatus for generating a digital data stream composed of a plurality of digital bits. The apparatus includes a clock for generating clock control signals coupled to a storage register which stores bits of the desired digital data stream and serially shifts the digital data stream bits to the storage register output. A detection circuit is coupled to the storage means and detects the bit values and the transitions between adjacent bits of the digital data stream at the output of the storage register. A generating circuit, responsive to the clock, is provided to generate a sequence of binary coded digital words corresponding to the magnitude of a sequence of samples of a gradual waveform. Control circuitry is coupled to the clock, the detecting circuit, and the generating circuit, to control the generating means such that digital samples of a predetermined rising portion of the gradual waveform are generated in response to a rising transition in the digital data stream. In addition, digital samples of a predetermined falling portion of the gradual waveform are generated in response to a falling transition. A digital word corresponding to a constant high level is generated after the predetermined rising portion until the beginning of the generation of a falling portion and a digital word corresponding to a constant low level is generated after the predetermined falling portion until the beginning of the generation of a rising portion. A digital to analog converter circuit is coupled to the generating circuit for converting the sequence of digital words to an analog waveform representative of the digital data stream. A filter circuit is coupled to the digital to analog converter for smoothing the analog waveform.

According to another feature of the invention, a switch input is provided for selecting one of a plurality of data words and a first memory register is provided for storing a data word. An input circuit reads the selected data word from the switch input at frequency intervals and stores the selected data word in the first memory register. A second memory register for storing a data word is also provided. A data comparator circuit compares the contents of the first memory register and the second memory register and stores the contents of the first memory register and the second memory in response to a difference in the contents of the first memory register and the second memory register. A logic circuit converts the data word in the second memory register to a corresponding desired digital data stream.

The invention as described is particularly suited for land, mobile communication systems utilizing digital coded squelch. The invention replaces conventional techniques using splatter filtering for the digital data bit stream and results in a system with reduced splatter and minimal droop and overshoot of the data signal. The invention is also compatible with systems including tone coded squelch.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

FIG. 3D is a program flow diagram showing a continuation of the ramp generation routine of the computer program for the invention.

FIG. 3E is a program flow diagram for the system monitor routine of the computer program for the invention.

DESCRIPTION OF THE PREFERRED EMBODIMENT

Figure 1:
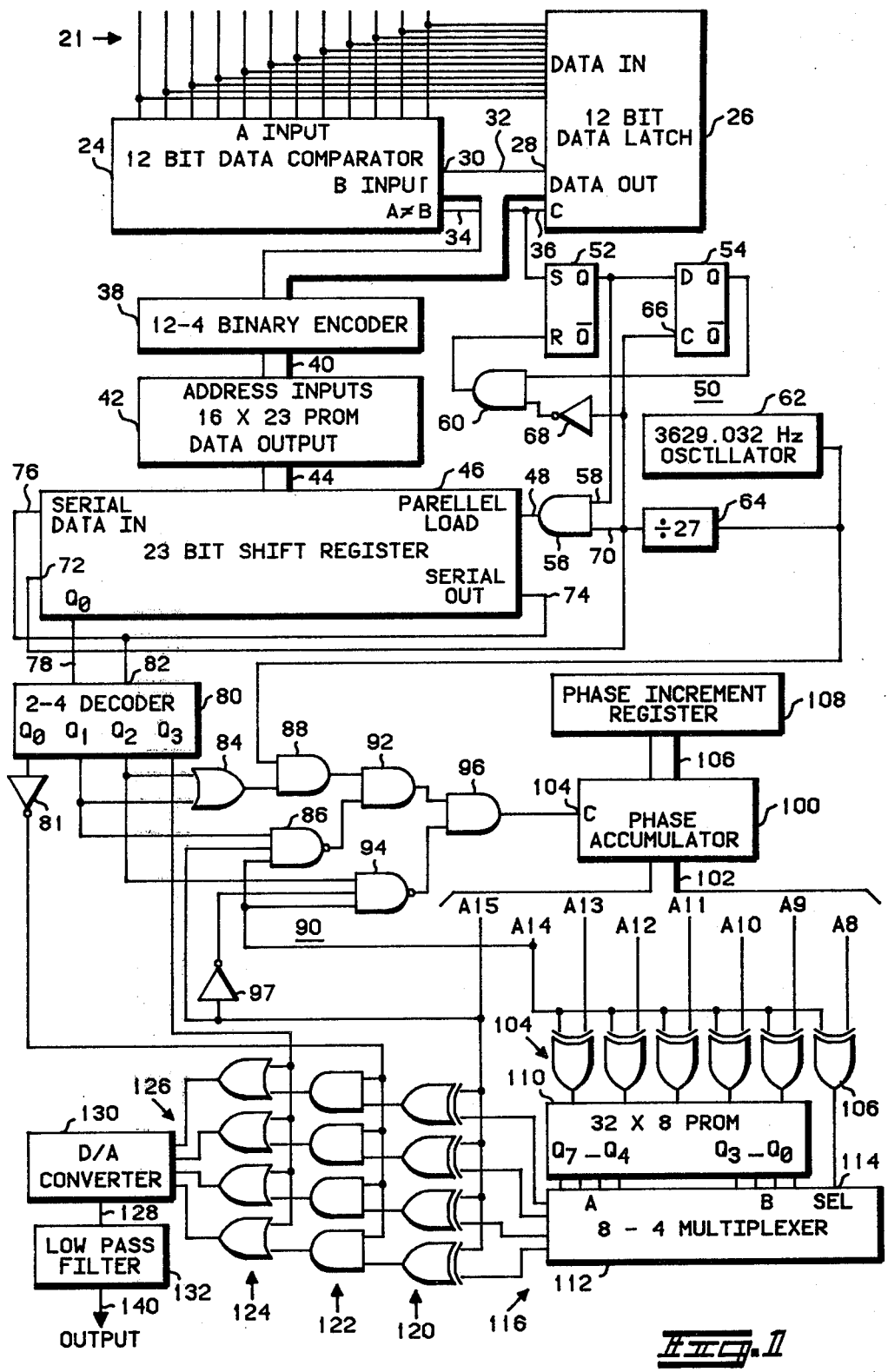
FIG. 1 is a detailed block diagram of a digital waveform shaping circuit according to the invention.

FIG. 1 is a detailed block diagram of a digital waveform shaping circuit for generating a desired digital data stream such that the transitions of the digital data stream are shaped to minimize frequency splatter when the digital data stream is utilized as a modulating signal in a communication system. The embodiment of FIG. 1 is particularly suitable for a radio communication system having a digital coded squelch, and uses a 23 bit Golay code at a frequency of 134.4 Hertz. Referring to FIG. 1, an input word of 12 bits supplied to the input terminals 21 (e.g. by means of a set of binary switches or selector switches, not shown) and coupled to the A input port of a 12 bit data comparator 24 and to the data input port of a 12 bit data latch 26, as shown. A 12 bit output port 28 of the data latch 26 is coupled to the B input port 30 of the data comparator 24 via a 12 bit data bus 32. Thus, the data in the latch 26 is coupled to the B input port 30 of the data comparator 24. The data comparator 24 continually compares the data applied to the A input port to the data applied to the B input port 30 and generates a pulse at an output 34, when the two data words are not equal. This pulse at the output 34 is coupled, as shown, to the clock input 36 of the data latch 26, which causes the data applied to the input terminals 21 to be strobed into the data latch 26 and applied to the data bus 32. Thus, the data on the input terminals 21 is stored in the data latch 26 and applied to the data bus 32 whenever there is a change in the data.

The data word applied to the data bus 32 is coupled, as shown, to a 12–14 bit binary encoder 38 which converts the 12 bit data word to a four bit address and applies it to a four bit address bus 40. The address bus 40 is coupled to the address input port of a 16×23 bit PROM 42. The 23 bit digital data word addressed by the four bit address is applied to the data output port of the PROM 42 and coupled via a 23 bit data bus 44 to a 23 bit shift register 46. The 23 bit data word is a digital data stream (e.g. a digital code for a digital coded squelch system) which will be waveshaped to provide gradual transitions. The digital data word is loaded into the shift register 46 in parallel, when a pulse is applied to the parallel load input 48.

The pulse coupled to the parallel load input 48 is generated by pulse generating circuitry indicated generally by the reference numeral 50. The pulse generating circuitry includes a flip-flop 52 with the S input coupled, as shown, to the output 34 of the data comparator 24. The Q output of the flip-flop 52 is coupled to the D input of a D flip-flop 54, and to the input 58 of an AND gate 56 as shown. The Q output of the flip-flop 54 is coupled to an AND gate 60. A clock 62 (with a frequency of 3629.032 Hz in the preferred embodiment) is coupled, as shown, to a frequency divider 64 which divides the clock frequency by a predetermined factor of 27 (thus providing a clock frequency of 134.4 Hz in the preferred embodiment). The divided clock signal from the divider 64 is coupled to the clock input 66 of the flip-flop 54, to the input of an inverter 68, to the input 70 of an AND gate 56, and to the clock input 72 of the shift register 46 as shown.

The pulse generating circuitry 50 described hereinbefore generates a pulse in response to a pulse at the output 34 of the data comparator 24. A pulse from the output 34 of the data comparator 24 sets the flip-flop 52, thus setting the Q output high which puts a high on the input 58 of the AND gate 56, thereby enabling the AND gate 56. This permits a clock pulse applied to the input 70 of the AND gate 56 from the divider 64 to be coupled to the parallel load input 48 of the shift register 46. In addition, the high Q output of the flip-flop 52 places a high on the D input of the flip flop 54 which results in a high on the Q output when a clock pulse appears on the clock input 66. This high on the Q output of the flip-flop 54 is coupled as shown to the AND gate 60, thereby enabling the gate 60. Therefore, when the clock pulse goes low, the low input to the inverter 68 will result in a high output from the AND gate 60 which will reset the flip-flop 52. Thus, the Q output of the flip-flop 52 will go low disabling the AND gate 56 and preventing the clock pulses from being coupled to the parallel load input 48 of the shift register 46. The net result is that a delayed pulse is applied to the parallel load input 48 in response to a pulse on the output 34 due to a new set of data on the input terminals 21. The pulse applied to the parallel load input 48 causes the shift register to load in the new data on the data bus 44.

The data in the shift register 46 is serially shifted within the shift register 46 due to the clock pulses coupled from the divider 64 to the clock input 72. The serial output 74 is coupled to the serial input 76, as shown, so that the last bit of the data is shifted into the first bit position as the data is shifted. Thereby, the data is rotated in the shift register 46. In addition, the first bit output $Q_0$ of the shift register 46 is coupled to the input 78 of a two to four bit decoder, as shown. The serial output 74 is also coupled to a second input 82 of the two to four bit decoder 80. The decoder 80 thus compares the first and last bit in the shift register 46. In effect, the decoder 80 functions as a bit transition and level detector such that a high on the $Q_0$ output of the decoder 80 represents a constant low level. A high on the $Q_1$ output represents a bit transition from a high to a low, a high on the $Q_2$ represents a bit transition from a low to a high and a high on $Q_3$ represents a constant high level. The two outputs $Q_1$ and $Q_2$ of the decoder 80 are coupled to logic circuitry indicated generally at 90 (to be described in detail hereinafter) for controlling the generation of a sequence of binary coded digital words corresponding to the magnitude of a sequence of samples of a predetermined portion of a gradual waveform. Thus, a detected falling bit transition (i.e. a high on $Q_2$) will result in the digital generation of a portion of a falling gradual waveform, and a detected rising transition (i.e. a high on $Q_1$) will result in the digital generation of a portion of a falling gradual waveform. The gradual waveform utilized in this preferred embodiment is a falling or rising half cycle of a sinusoidal waveform. However, other non-abrupt waveforms could be utilized (e.g. a triangular waveform). The digital samples of the sinusoidal waveform (i.e. a digitized sinusoidal waveform) are generated utilizing a 16 bit phase accumulator 100 which comprises a 16 bit binary adder and a 16 bit register (not shown in detail) which are used to generate an address signal on an output bus 102. The clock signal is applied to the clock input 104, from the output of an AND gate 96. The frequency of the clock is the sampling frequency for the sequence of samples of the portion of the sinusoidal waveform generated. An input port 106 is provided which is coupled to a memory register referred to as a phase increment register 108. A phase increment value equal to the desired sinusoidal frequency divided by the sample frequency is stored in the phase increment register 108. This phase increment is the phase change that occurs in the generated sinusoidal waveform in the interval between samples. For the preferred embodiment, the desired sinusoidal waveform frequency is chosen to have a period approximately equal to the twice bit time of the desired digital data stream (i.e. 69.8 Hz). The phase increment is added to the accumulator total upon each clock pulse applied to the clock input 104, thereby incrementing the phase accumulator by the phase increment. The eight most significant bits (A8 through A15) of the accumulator sum in the accumulator are coupled, as shown, to an array of exclusive OR gates and the remaining eight least significant bits are ignored. The most significant bit A15 is coupled to an array of four exclusive OR gates 120, the next most significant bit A14 is coupled to an exclusive OR gate array 104 and an additional exclusive OR gate 106, as shown. The next five most significant bits A13–A9 are coupled to the exclusive OR gate array 104, and the last bit A8 is coupled to the exclusive OR gate 106, as shown. Exclusive OR gate array 104 is coupled to the address inputs of a 32×8 bit PROM 110. The PROM 110 contains a set of 64 digital words representative of the magnitude of corresponding samples of the first quadrant of a sine waveform with each digital word composed of four bits. The data is arranged in the PROM 110 so that each eight bit location contains two adjacent digital samples with the first in the four most significant bits of the memory location and the second in the remaining four bits of the memory location. The data in the upper half of the addressed memory location of the PROM 110 is coupled from the outputs $Q_4$–$Q_7$ to the A input port of a multiplexer 112, and the lower half of the memory location of the PROM 110 is coupled from the outputs of $Q_0$–$Q_3$ to the B input port of the multiplexer 112, as shown. A high signal applied to the select input 114 of the multiplexer 112 from the exclusive OR gate 106 will cause the data at the B port to be coupled to the output 116 of the multiplexer 112, and low applied to the select aspect 114 will cause the data at the A port to be coupled to the output 116. The four line output 116 is coupled, as shown, to the array of exclusive OR gates 120. When a digitized rising or falling waveform is generated, the A15, A14, and A8 bit lines function as control bits and the A13 through A9 bits function as address bits to address the PROM 110 memory locations.

The rising waveform is generated in the preferred embodiment by generating the fourth followed by the first quadrant of the sine waveform. The fourth quadrant can be generated by reading the data out of the PROM 110 in reverse order by complementing the addresses and simultaneously complementing the output data. A high A15 bit, coupled as shown to the external OR array 120, complements output data, and a high A14 bit, coupled as shown to the exclusive OR gate array 104 complements the address bits A13–A9 and select bit A8. Thus, a sequence of digital words representing the fourth quadrant are generated as a phase accumulator steps the bits A13–A8 through the sequence until the phase accumulator 100 reaches it maximum. The next clock pulse will cause the accumulator to overflow so that the A15 and A14 bits will both become zero with the result that neither the address inputs nor the data outputs are complemented and therefore the first quadrant of the sine waveform will be generated. The end of the first quadrant generation will result when the A14 bit goes high as will be more fully discussed hereinafter.

The falling waveform requires the generation of the second quadrant followed by the third quadrant of the sine waveform. The second quadrant requires that the PROM data be read out in reverse order, thus, the second quadrant starts with the A15 bit low and the A14 bit high thereby complementing the address bits. At the end of the second quadrant the A14 bit goes low and the A15 bit goes high, thereby causing the data to be read out of the PROM 110 in forward order, but the data output from the output 116 of the multiplexer 112 will be complemented by the exclusive OR gate array 120. This results in the generation of sine waveform third quadrant samples. The end of the falling waveform generation will result when both the A15 and A14 bits become high.

The logic circuitry indicated generally by the reference numeral 90 controls the generation of the rising or falling waveforms. The control logic 90 includes a three input NAND gate 86 and a three input NAND gate 94 with the A14 bit line coupled to an input of each, as shown. Also coupled to an input of the NAND gate 86 is the $Q_1$ output of the decoder 80 and to the third input of the NAND gate 86 is coupled the A15 bit line. $Q_2$ output of the decoder 80 and the output of the inverter 97 are each coupled to an input of NAND gate 94, as shown. The inverter 97 is coupled, as shown, to the A15 bit line. The outputs $Q_1$ and $Q_2$ of the decoder 80 are coupled to an OR gate 84 and the output of the OR gate 84 is coupled to the first input of a two input AND gate 88. Coupled to the second input of the AND gate 88 is the output of the clock oscillator 62, while the output of the AND gate 88 is coupled to the first input of a two input AND gate 92. The output of the AND gate 86 is coupled to the second input of the NAND gate 92, as shown, and the output of the AND gate 92 is coupled to the first input of the two input AND gate 96. The output of the NAND gate 94 is also coupled to the second input of the AND gate 96. The output of the AND gate 96 is coupled to the clock input 104 of the phase accumulator 100. This control logic circuitry 90 controls the generation of the rising and falling waveforms by enabling and disabling the clock signal to the phase accumulator at the required times.

When either the $Q_1$ or the $Q_2$ output of the decoder 80 are high, this indicates that a transition between adjacent bits exists. The high on either $Q_1$ or $Q_2$ is coupled to the OR gate 84 enabling the AND gate 88 permitting the clock signal to pass through to the AND gate 92 whenever a transition has been detected. However, if both $Q_1$ and $Q_2$ are zero, no transition has occurred and therefore the clock is not allowed to pass through the AND gate 88 and the accumulator is therefore disabled. As a result, the accumulator can be activated by clock pulses only when either the $Q_1$ or the $Q_2$ output of the decoder 80 are high (i.e. when there is a rising or falling transition). If the $Q_1$ output of the decoder 80 is high, representing a falling transition, then the AND gate 88 will be enabled, and the low on $Q_2$ of the decoder 80 will result in a high on the output of the NAND gate 94, then enabling the AND gate 96. Unless all three of the inputs to the NAND gate 86 are high, the output of the NAND gate 86 will be high thereby enabling the AND gate 92. This will only occur when the A15 bit line and the A14 bit line are high. Thus, the clock signal will be coupled to the accumulator 100 generating the falling digitized waveforms values until it is stopped when both the A15 and the A14 bits go high disabling the AND gate 92. When the next transition occurs, it will be a rising transition causing the $Q_1$ of the decoder 80 to be low, and the $Q_2$ of the decoder 80 to be high. This will result in a low input to the NAND gate 86 enabling the AND gate 92 thus permitting clock signals to pass through to the input 104 until all three inputs of the NAND gate 94 go high. This will occur when the A15 bit line goes low and the A14 bit line goes high. Thus, the digitized rising waveform values will be generated until the accumulator is stopped when the A15 bit line goes low and the A14 bit line simultaneously goes high causing a low on the output of the NAND gate 94 thereby disabling the AND gate 96.

The $Q_0$ output of the decoder 80 is coupled, as shown, through an inverter 81 to an array of four AND gates 122 which are coupled to an array of four OR gates 124, as shown. A high level on the $Q_0$ output of the decoder 80, indicating a continued low level, will therefore result in a low output to each AND gate in the gate array 122. The result is that all four AND gates 122 will be disabled, and will have low levels on their outputs. Thus, a low on the $Q_0$ output of the decoder 80 will produce four lows (i.e. zeros) coupled through the OR gate array 124. The output $Q_3$ of the decoder 80 is coupled to the array of OR gates 124, as shown. A high on the $Q_3$ output of the decoder 80 indicating a continued high level will result in all high levels (i.e. all ones) on the output of the OR gates 124. The OR gate array 124 is coupled, as shown, to a digital to analog (D/A) converter 130 which functions in the conventional manner to convert digital words applied to the input port 126 to a corresponding analog signal at an output 128. The resulting signal at the output 128 is a digital data stream in which the transitions have the approximate form of a portion of a sinusoidal waveform. This signal is then filtered using a low-pass filter 132 (a three pole low-pass filter is preferred) to provide a smooth analog waveform at the output 140. The smooth output signal at the output 140 may then be utilized in a radio transmitter (not shown) to modulate the carrier.

Figure 2:
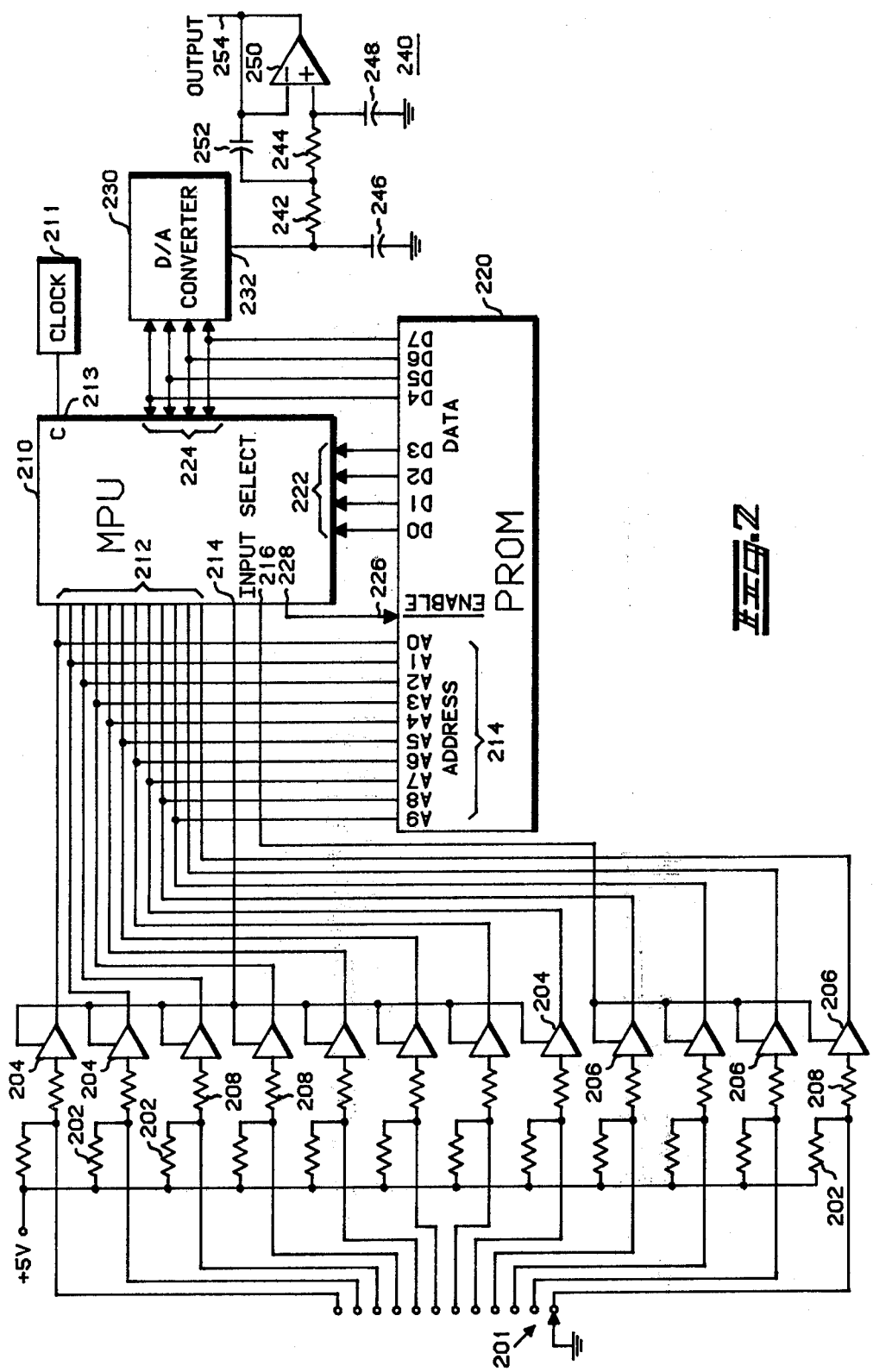
FIG. 2 is a block diagram illustrating a microprocessor implementation of the preferred embodiment of the invention.

Referring now to FIG. 2, there is shown a detailed diagram of the preferred embodiment of the invention wherein the circuitry is partially realized via a standard microcomputer (preferably the commercially available MOSTEK 3870 microcomputer). A 12 position mode switch 201 in conjunction with a set of pull up resistors 202 coupled as shown, determine a 12 bit input mode word which is applied, as shown, to the inputs of two arrays of tristate buffers 204, 206 through an appropriate set of input resistors 208. The 12 bit mode word is applied to a microcomputer 210 through the input/output (I/O) port 212 by enabling the tristate buffers 204, 206. Tristate buffers 204, 206 are periodically enabled by a signal applied by the microcomputer 210 via the input select lines 214, 216. The applied input word is then stored in a memory location (not shown) within microcomputer 210. The microcomputer 210 uses the input word to determine an address corresponding to the 12 bit input word if there has been a change since the previous input operation, and outputs the address on the I/O port 212. The address is coupled, as shown, to the address port 214 of a PROM 220. The PROM 220 data thereby addressed is multiplexed through the input port 222 and the I/O port 224, when a signal is applied to the enable input 226 of the PROM 220 from the output 228. The result is that the data which determines the specific 23 bit digital data stream code to be generated is addressed in the PROM 220 and multiplexed into the microcomputer 210 under the control of the microcomputer 210. A clock 211 is coupled to the clock input 213 of the microcomputer 210, as shown, and the I/O port 224 of the microcomputer 210 is coupled to a conventional digital to analog converter 230. A sequence of four bit binary coded digital samples corresponding to the desired digital data stream is generated by the microcomputer 210 at the I/O port 224 and is converted to an analog signal at the output 232 of the D/A converter 230. The analog output 232 is coupled, as shown, to a conventional three pole low-pass filter (preferably with a cut off frequency of 300 Hz) indicated generally by the reference numeral 240. The filter 240 is composed of the resistors 242 and 244, the capacitors 246, 248 and 252 and the amplifier 250 configured as shown. The resulting signal at the output 254 is a smoothed analog digital data stream suitable for modulating a carrier in a radio communication system.

Figure 3A:
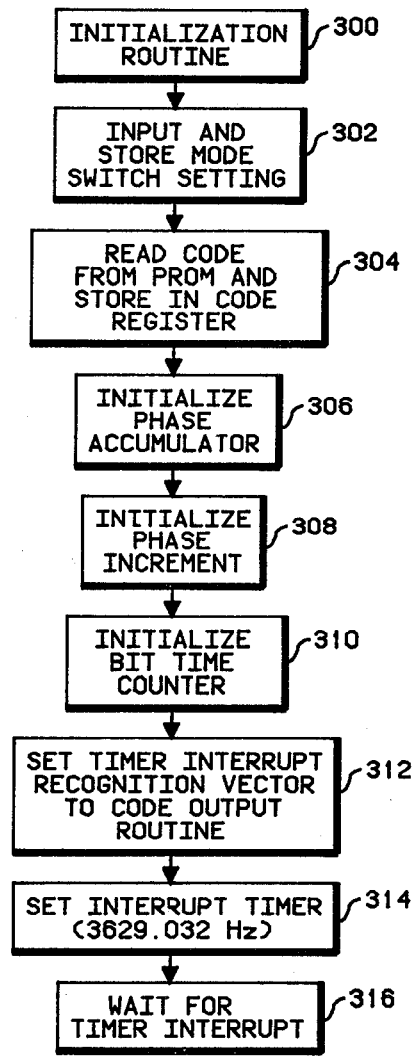
FIG. 3A is a program flow diagram for the initialization routine of the computer program for the invention.
Figure 3B:
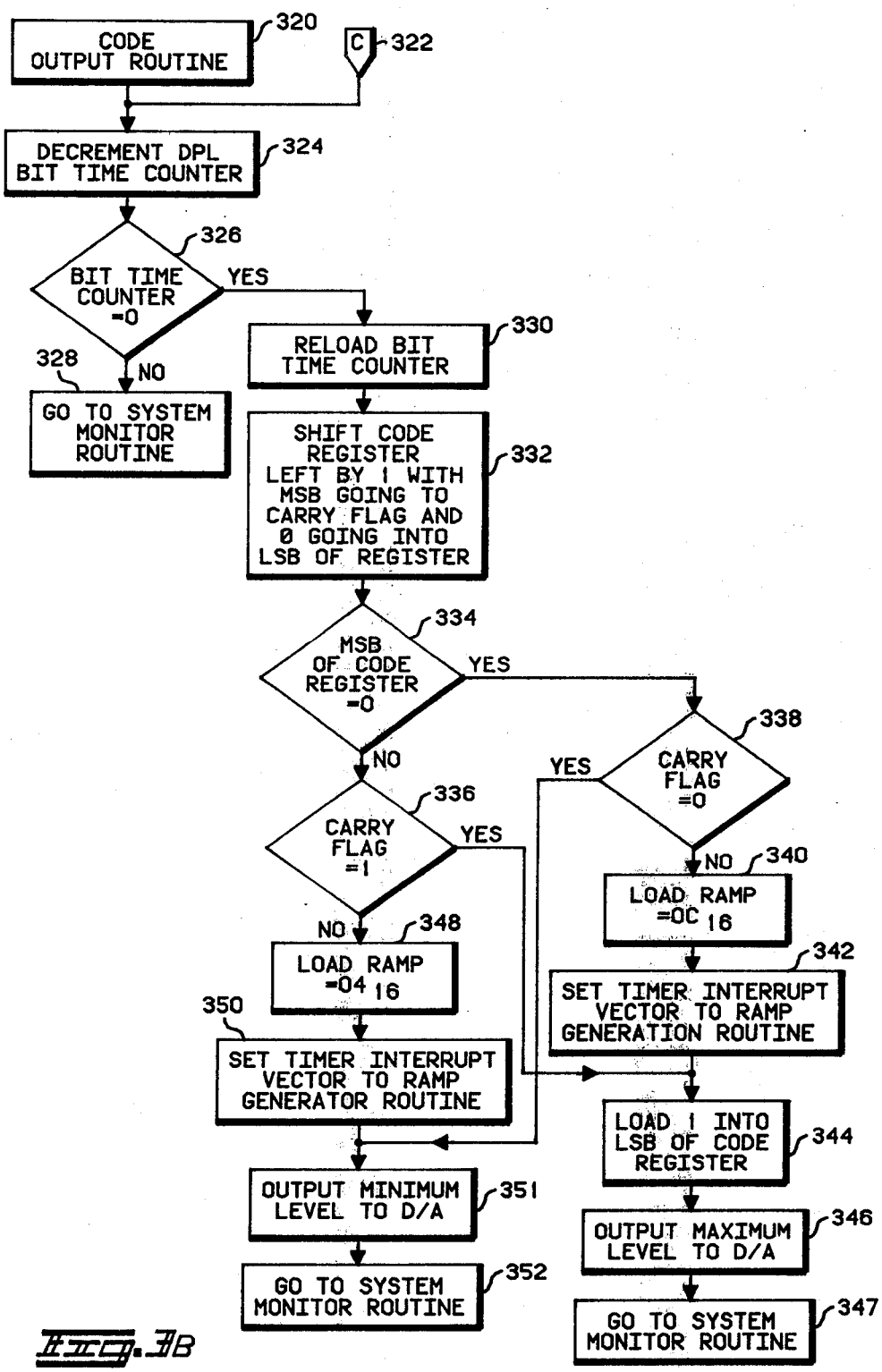
FIG. 3B is a program flow diagram for the code output routine of the computer program for the invention.

FIG. 3A is a program flow diagram for the initialization routine of the computer program for the microcomputer 210 of FIG. 2 to implement the invention. This routine is entered at block 300 after which the mode switch data is read and stored as indicated at block 302. Using the mode switch data the data stream code information is multiplexed from the PROM (220 of FIG. 2) and a 23 bit data stream code is determined therefrom and stored in the code register as indicated at block 304. Then the phase accumulator and the phase increment are initialized to starting values as shown at block 306, 308 and a bit time counter which determines the desired bit time period is initialized as shown at block 310. Program flow proceeds to block 312, where the timer interrupt vector is set by storing the proper starting address of a code output routine (to be described hereinafter) in a timer interrupt vector memory location. The interrupt timer registers are then set to establish the desired timer frequency (3629.032 Hz in the preferred embodiment) as shown at block 314. As indicated at block 316 when a timer interrupt occurs, the program flow will proceed to the routine determined by the timer interrupt vector, which at this point in the program is the code output routine of FIG. 3B beginning at block 320. Referring to FIG. 3B, the bit time counter is first decremented as shown at block 324 and then the bit time counter is checked to determine if it is equal to zero. If the bit time counter is not equal to zero, program flow then proceeds to a system monitor routine (shown in FIG. 3E to be described hereinafter) which is shown at block 328, and if the bit time counter is equal to zero, program flow proceeds to block 330 where the bit time counter is reset. Then the code register is shifted left by one position, with the most significant bit being moved to the carry flag location and the least significant bit being set to zero in order to begin a rotate operation, as shown at block 332. The most significant bit of the code register is then checked to determine if it is zero, as shown at block 334. If the most significant bit is not zero, then the carry flag is tested to determine if it is a one, as shown at block 336. If the carry flag is equal to one, indicating that the two bits are high with no transition, program flow proceeds to block 344 as shown, to set the least significant bit equal to one, thereby completing the one bit rotation of the code register contents. Since a constant one level has been detected, the output is set to a maximum level output at block 346 and program flow then proceeds to the system monitor routine as shown at block 347. If the carry flag is not one, indicating a transition from a zero to a one bit, then the memory location labelled RAMP is loaded with a $0C_{16}$ to initialize the generation of the rising waveform, as shown at block 348. The program flow then proceeds to block 350 at which the interrupt vector is set to go to the starting address of the ramp generation routine (shown in FIG. 3C). Then a zero level (minimum level) is output as shown at block 351, after which program flow proceeds to the system monitor routine (FIG. 3E) as shown at block 352. If, however, the most significant bit of the code register is equal to zero at block 334, then the carry flag is checked to determine if it is equal to zero, as shown at block 338. If the carry flag is zero, indicating a zero level with no transition, program flow proceeds to block 351, to output a zero level and then to the system monitor routine, as shown at block 352. If the carry flag is not zero, indicating a transition from a one to a zero bit, then the memory location RAMP is set to $0C_{16}$ to initialize the generation of the falling waveform, as shown at block 340. The timer interrupt vector is then set to go to the ramp generation routine (FIG. 3C) at block 342 and a one is loaded into the least significant bit of the code register at block 344 completing the one bit rotation of the code register contents. A maximum level is then output, as shown at block 346 and the program flow proceeds to the system monitor routine, as indicated by block 347.

Figure 3C:
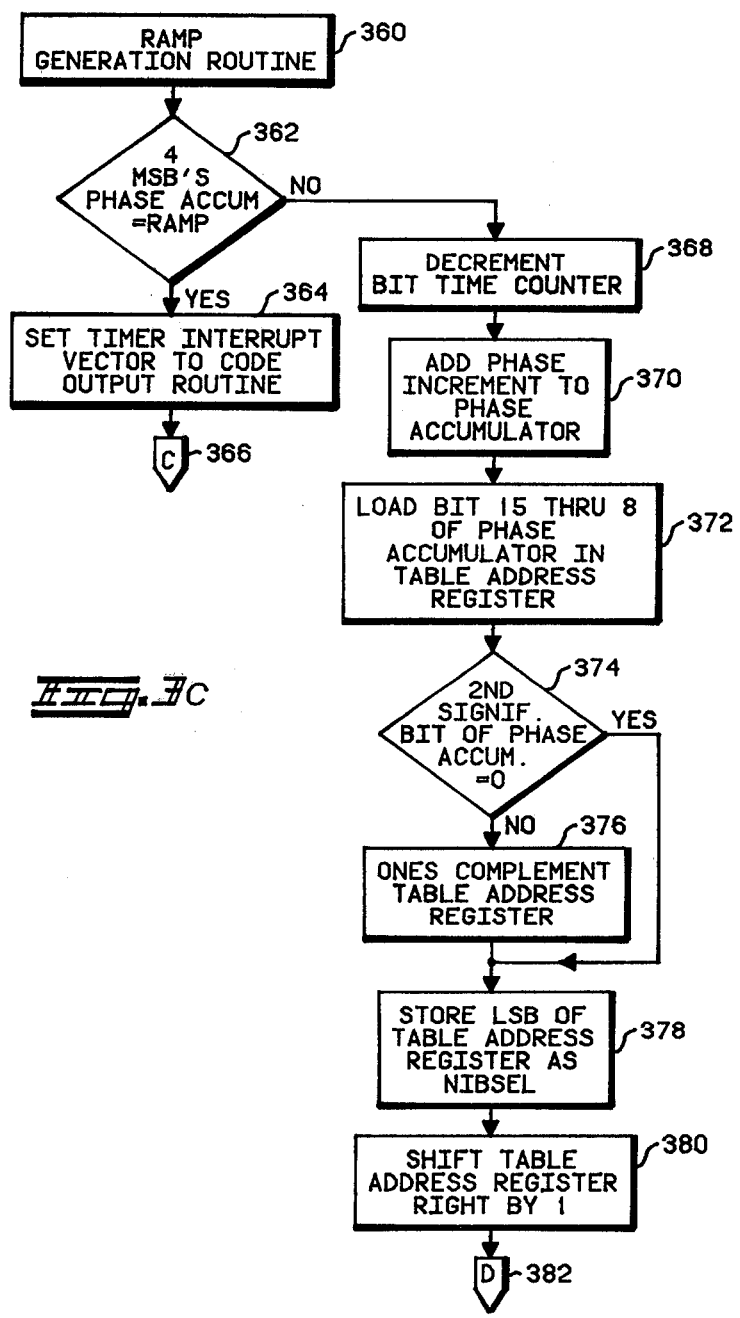
FIG. 3C is a program flow diagram for the ramp generation routine of the computer program for the invention.

Referring now to FIG. 3C, there is shown a flow diagram of the ramp generation routine which is entered at block 360 in response to a timer interrupt, when the timer interrupt vector is set to the address of the ramp generation routine. First, the most significant four bits of the phase accumulator are checked to determine if they are equal to the value in the memory location RAMP, as shown at block 362. If they are equal, indicating that the generation of the gradual or ramp waveform is complete, the timer interrupt vector is set to the starting address of the code output routine at block 364 and then the program flow proceeds to block 366. The program will then proceed to jump to block 322 of FIG. 3B and the into the code output routine at block 324 of FIG. 3B. If, however, the result of the block 362 test is no equality, indicating that the gradual waveform is still being generated, program flow proceeds to block 368 where the bit time counter is decremented after which the phase increment is added to the phase accumulator, as shown at block 370. Then the most significant byte (most significant eight bits) of the phase accumulator is loaded into the register referred to as the table address register, as shown at block 372. The value in the table address register will ultimately be used to address a digital sample stored in a table of waveform samples (the waveform table) of the first quadrant of a sine waveform. The second most significant bit (i.e. bit 14) of the phase accumulator is then tested to determine if it is equal to zero, at block 374. If it is not, indicating that the waveform table must be read in reverse order, then the table address register is complemented as shown at block 376 and program flow proceeds to block 378. If, however, the second most significant bit is zero at block 374, then the program flow proceeds directly to block 378 and the least significant bit of the table address register is stored in a register labelled NIBSEL. As described previously, the table is composed of four bit samples, arranged with two in each eight bit table location, thus the value of the least significant bit of the table address register is stored and used to determine whether the upper or lower four bits of the table are used. Next, the table address register is shifted right one bit thereby dropping the least significant bit out of the table address register since it is not used to address the waveform table, as indicated at block 380. The program flow proceeds to block 382, labelled D, which indicates that the program proceeds to block 384 of FIG. 3D and then directly to block 386 of FIG. 3D. As shown at block 386, the starting address of the waveform table is added to the table address register to obtain the actual address in memory of the waveform table value desired. The addressed value is then stored in a value register, as shown at block 388. Next, at block 390 the most significant bit of the phase accumulator is tested to determine if it is equal to zero and if it is not equal to zero, the contents of the value register is complemented as indicated at block 392 and then program flow proceeds to block 394. If the most significant bit of the phase accumulator is found to be equal to zero at block 390, program flow proceeds to block 394 where the value of the register NIBSEL is checked to determine if it is equal to one. If NIBSEL is not equal to one, indicating that the upper four bits of the waveform table value must be used, the upper four bits of the value register is output at block 396. The program then proceeds to the system monitor routine as shown at block 400. If, however, NIBSEL is equal to one, the lower four bits of the value register is output and the program flow proceeds to block 400 and on to the system monitor routine.

The flow diagram for the system monitor routine is shown in FIG. 3E and is entered at block 402. The routine first reads and stores the mode switch data, as indicated at block 404 and the new data is compared to the previous data, as shown at block 406. If a change has occurred since the last reading of the mode switches, then at block 410 the program jumps to the initialization routine shown in FIG. 3A and described previously. If there has been no change in the mode switch data, the program proceeds to block 408 and waits for a timer interrupt. When a timer interrupt occurs, the program flow proceeds to the address determined by the timer interrupt vector.

In summary, a digital waveform shaping method and apparatus suitable for generating a digital data stream for use in a radio communication system has been described. In addition, the system is particularly adaptable for implementation in a microcomputer system.

While a preferred embodiment of the invention has been described and shown, it should be understood that other variations and modifications may be implemented. It is therefore contemplated to cover by the present application any and all modifications and variations that fall within the true spirit and scope of the basic underlying principles disclosed and claimed herein.

What is claimed is:

1. Digital waveform shaping apparatus for generating a desired digital data stream composed of a plurality of digital bits comprising:
    clock means for generating clock signals;
    storage means, coupled to the clock means and having an output, for storing bits of the desired digital data stream and for serially shifting the digital data stream bits to the output;
    detecting means, coupled to the storage means, for detecting the bit values and the transitions between adjacent bits of the digital data stream at the output of the storage means;
    generating means, responsive to the clock means, for generating a sequence of binary coded digital words corresponding to the magnitude of a sequence of samples of a gradual waveform;
    control means, coupled to the clock means, detecting means, and generating means, for controlling the generating means such that said sequence of binary coded digital words corresponding to a predetermined rising portion of said gradual waveform are generated in response to a rising transition in the digital data stream, said sequence of binary coded digital words corresponding to a predetermined falling portion of said gradual waveform are generated in response to a falling transition, a digital word corresponding to a constant high level is generated after said predetermined rising portion until the beginning of the generation of a falling portion, and a digital word corresponding to a constant low level is generated after said predetermined falling portion until the beginning of the generation of a rising portion;
    clock control means, coupled to the clock and the generating means, and the detecting means, for passing the clock signal to the generating means during generation of the predetermined rising or falling waveform portions, and for blocking the clock signal from the generating means during the generation of constant high or low levels
    converter means, coupled to the generating means, for converting the sequence of digital words to an analog waveform representative of the digital data stream; and,
    filter means, coupled to the converter means, for smoothing the analog waveform.

2. The digital waveform apparatus of claim 1 wherein the clock means comprises:
    master clock means for generating a master clock signal;
    divider means coupled to the master clock means, for frequency dividing the master clock signal by a predetermined divisor.

3. The digital waveform apparatus of claim 2 wherein the storage means is a shift register.

4. The digital waveform apparatus of claims 1, 2 or 3, wherein the detecting means includes: a two to four line decoder, coupled to the storage means.

5. The digital waveform shaping apparatus of claim 4, wherein the control means includes:
    logic means, coupled to the decoder, for generating a digital word corresponding to a constant high level in response to the detecting means detecting a high level after generation of the samples of said predetermined rising portion of said gradual waveform, and for generating a digital word corresponding to a constant low level in response to the detecting means detecting a low level after generation of the samples of said predetermined falling portion of said gradual waveform.

6. The digital waveform shaping apparatus of claim 1 further comprising:
    switch input means for selecting one of a plurality of data words;
    first memory register for storing a data word;
    means for reading the selected data word from the switch means at frequent intervals and storing the selected data word in the first memory register;
    second memory register for storing a data word;
    data comparator means for comparing the contents of the first memory register and the second memory register and for storing the contents of the first memory register in the second memory register in response to a difference in the contents of the first memory register and the second memory register;
    logic means for converting the data word in the second memory register to a corresponding desired digital data stream.

7. The digital waveform apparatus of claim 6, wherein the storage means is a shift register.

8. The digital waveform apparatus of claim 7, wherein the detecting means includes:
    a two to four line decoder, coupled to the storage means.

9. The digital waveform apparatus of claims 6, 7 or 8, wherein the control means includes:
    clock control means coupled to the clock, the generating means, and the decoder, for passing the clock signal to the generating means during generation of the predetermined rising or falling waveform portions, and for blocking the clock signal from the generating means during the generation of constant high or low levels;
    logic means, coupled to the decoder, for generating a digital word corresponding to a constant high level in response to the detecting means detecting a high level after generation of the samples of said predetermined rising portion of said gradual waveform, and for generating a digital word corresponding to a constant low level in response to the detecting means detecting a low level after generation of the samples of said predetermined falling portion of said gradual waveform.

* * * * *